Figure 1:
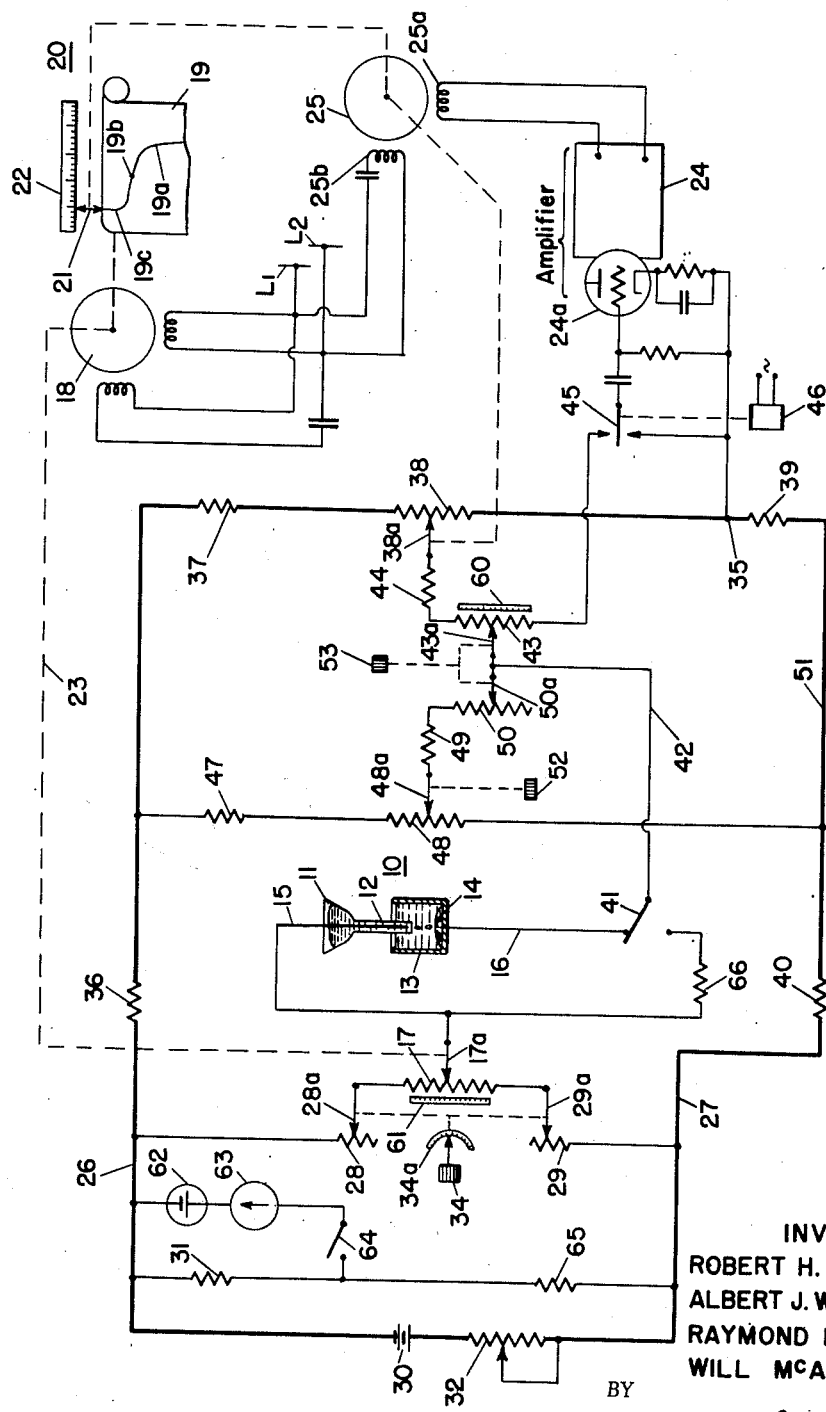

Nov. 10, 1953

R. H. CHERRY ET AL 2,659,047

CURRENT-MEASURING SYSTEM

Filed March 8, 1950

2 Sheets-Sheet 1

INVENTORS
ROBERT H. CHERRY
ALBERT J. WILLIAMS, JR.
RAYMOND E. TARPLEY
WILL McADAM

BY Woodcock and Phelan

ATTORNEYS.

Nov. 10, 1953  R. H. CHERRY ET AL  2,659,047
CURRENT-MEASURING SYSTEM
Filed March 8, 1950  2 Sheets-Sheet 2

INVENTORS
ROBERT H. CHERRY
ALBERT J. WILLIAMS, JR.
RAYMOND E. TARPLEY
WILL McADAM
BY
*Woodcock and Phelan*
ATTORNEYS.

Patented Nov. 10, 1953

2,659,047

UNITED STATES PATENT OFFICE 2,659,047

CURRENT-MEASURING SYSTEM

Robert H. Cherry, Glenside, Albert J. Williams, Jr., and Raymond E. Tarpley, Philadelphia, and Will McAdam, Ambler, Pa., assignors to Leeds and Northrup Company, Philadelphia, Pa., a corporation of Pennsylvania Application March 8, 1950, Serial No. 148,344

16 Claims. (Cl. 324—31)

This invention relates to current-measuring systems, more particularly of the type which present zero resistance to the source of current to be measured, and has for an object the provision of a current-measuring system in which the current sensitivity may be varied as desired without change in the theoretical reference position which would be assumed by an indicating system when the current to be measured is zero.

The present invention is particularly applicable to systems for chemical analyses of the type in which valuable information may be secured by determining the relation between the applied voltage to and current flow through a solution. In one form of such chemical analyses commonly referred to as "polarographic analysis," there is applied to a solution in a cell a steadily changing voltage for producing electrolysis of the solution. The resulting current flow through the solution is recorded with reference to the applied voltage. Identification of oxidizable or reducible substances in solution in the cell can be realized by their characteristic variation of current with applied voltage. Where the dropping-mercury type of cell is utilized, it is to be understood that when the mercury drop grows in size the current will increase to a maximum value and as the drop falls from the electrode the current will decrease to a lower value. For each reducible or oxidizable substance in the solution there is a limiting value of current generally referred to as the limiting diffusion current. With such variation in current due to the dropping electrode as well as that due to the limiting diffusion effect, it will be understood that it is highly desirable to have available a current-measuring system of considerable flexibility as regards current range in order that the current flow can be measured with great accuracy under all conditions of operation.

For example, where there is a mixture of several substances in the solution the limiting diffusion current may differ materially for each substance. Thus, it may be desirable to adjust both the upper and lower limits of the range of currents measurable by the recorder to values suited to the particular substance on which measurements are being made. Stated differently, the present invention provides a method and means for establishing on the recorder any desired indication for a given current flow and for changing the current sensitivity as desired. The change in current sensitivity can be made without change in the theoretical position of the recorder when the current to be measured is zero.

In carrying out the invention in one form thereof, there is provided for the measuring system a circuit including the potential applied to a cell containing the solution to be analyzed. The current-measuring system, which may be used for other purposes than in chemical analyses, comprises a resistor traversed by the current to be measured. A slidewire is adjusted by a detector to develop a potential drop to balance that across the resistor for null measurement of the current flowing therethrough. By varying the magnitude of the resistor the current sensitivity of the system may be adjusted as desired. Provision is made for introduction into the system of a second current to establish any desired indication on the scale or chart of a recorder for any selected value of current to be measured. This second current is varied in inverse ratio with change of sensitivity to retain the same balance point when the current to be measured is zero.

Figure 2:
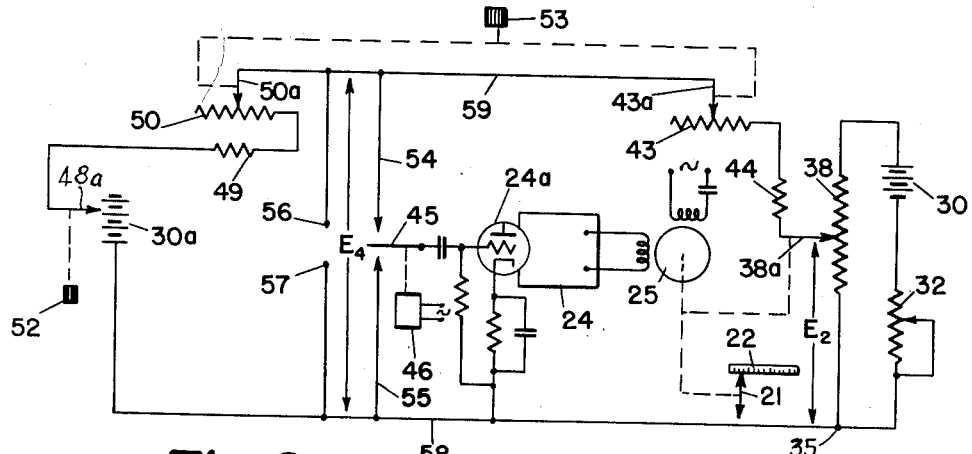
Figure 3:
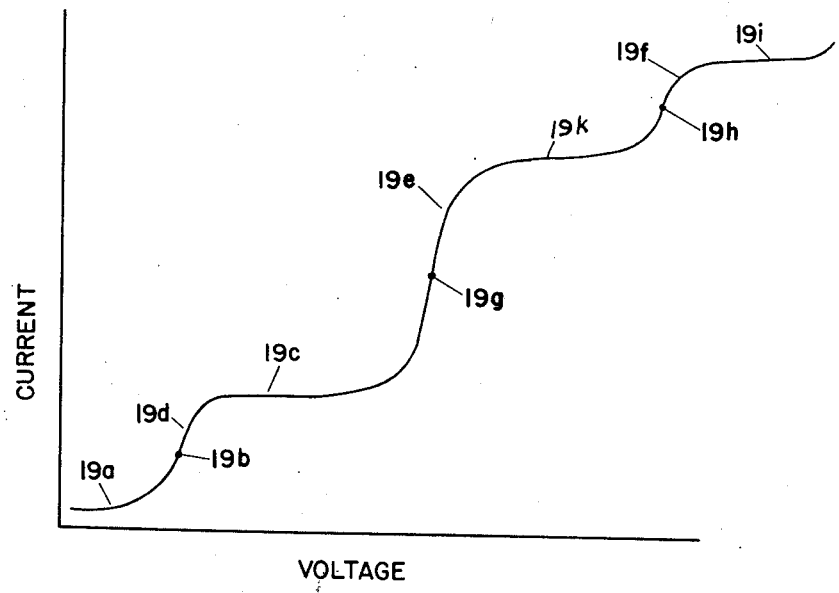

For further objects and advantages of the invention, reference is to be had to the following description and to the accompanying drawings, in which:

Fig. 1 diagrammatically illustrates a system embodying the invention;

Fig. 2 is a simplified wiring diagram illustrating an electrical equivalent of a part of the circuit of Fig. 1 and in part a modification thereof; and Fig. 3 is a chart useful in explaining the operation of the invention in one application thereof.

Though many features of the invention are generally applicable to current-measuring systems, the invention has been illustrated in Fig. 1 as applied to electrochemical analyses in which there is provided a polarizing cell 10 of the dropping-mercury type in which the mercury within a storage reservoir 11 slowly flows through capillary tube 12, drops of mercury periodically forming at the end of the capillary tube 12 and in succession falling to the bottom of container 13 where there is accumulated a pool 14 of mercury. There is disposed in the mercury within the reservoir 11 an electrode formed by an extension of conductor 15, and an extension of conductor 16 is in conductive contact with the pool of mercury 14. Both the drops forming at the end of the capillary tube 12 and the mercury pool 14 are in conductive contact with the solution to be analyzed.

An appreciation of the problem involved in the use of such a polarizing cell 10 will be apparent from a brief description of the operation of the system. A steadily changing polarizing voltage is applied to the cell 10 by driving at constant speed the contact 17a relative to slidewire resistor 17 as by a motor 18 which is also utilized to drive the chart 19 of an indicator-recorder 20 provided with a pen-index 21 adjustable relative to chart 19 and a scale 22. While the motor 18 has been shown as an induction motor, it will frequently be preferred to utilize a synchronous motor to drive the chart 19 through driving connection 23 to drive the contact 17a relative to resistor 17. Where non-synchronous motors are utilized, it is necessary that they shall drive both the chart and contact 17a, whereas with synchronous motors separate motors may be utilized for the aforesaid functions. For the sake of simplicity, in the following description and claims reference will be made to adjustment of each contact associated with a resistor or slidewire or to adjustment of the slidewire and it is to be understood that either statement is to be taken as meaning relative adjustment therebetween, and either the contact or slidewire or both may be adjusted relative to the other.

Since the chart 19 is driven in synchronism with change in position of contact 17a, it will be at once understood that the vertical movement of the chart 19 will be in synchronism with the change in potential applied to the cell 10 due to the movement of contact 17a as from one end of resistor 17 to the other end thereof. As the potential difference or voltage applied to the cell 10 rises, current will flow therethrough. As a result of that current flow, an amplifier 24 will control the energization of a motor 25 to drive the pen-index 21 relative to chart 19 and scale 22. The amplifier 24 is preferably of the high input-impedance type and the circuit arrangement provides for null measurement of the current. As more fully explained in Cherry Patent No. 2,267,551, a typical record produced on the chart 19 will show a slow change of current at 19a, as the potential applied to the cell is increased, and thereafter a steeply rising current followed by a slowly changing current 19c. The magnitude of change of the steeply rising current from one slowly changing value to the other is taken as an indication of the quantity or degree of concentration of a particular ion or substance in the solution in cell 10. The midpoint 19b of the zone of the steeply rising current with reference to the voltage at that point is then known and the particular substance or ion in the solution can be identified.

The substance to be identified in the cell 10 will suggest the nature of the desired variation of the potential applied to the cell. In polarographic analysis the maximum variation of the potential applied to the cell 10 is ordinarily of the same magnitude, as for example two volts, though this variation may have arbitrary end points as from zero to −2 volts, −1 to −3 volts, or from +1 to −1 volt. In accordance with one aspect of the invention, the variable slidewire resistor 17 is connected between conductors 26 and 27 by way of variable resistors 28 and 29. Conductors 26 and 27 are connected to the source of potential 30 illustrated as a battery, though it is to be understood it may be a regulated current supply or the like.

In series with the source 30 is a variable resistor 32, the latter being used to predetermine the potentials applied to conductors 26 and 27. Contactes 28a and 29a of resistors 28 and 29 are ganged, that is to say, they are mechanically connected together as indicated for operation by a knob 34 for variation of the resistance thereof in opposite directions and by equal amounts. As the resistance of resistor 28 is increased by movement of contact 28a with respect thereto, the resistance of resistor 29 is decreased by movement of contact 29a with respect thereto. In this manner the resistance in the branch of the circuit including resistors 17, 28, and 29 connected to conductors 26 and 27 is maintained constant.

The voltage applied to the cell 10 with the parts as shown in Fig. 1 has already been described as dependent upon the position of contact 17a relative to resistor 17.

The potential applied to the cell 10 for any given position of contact 17a with respect to resistor 17 and for given setting of contacts 28a and 29a relative to resistors 28 and 29, respectively, is determined with reference to a point 35 in a loop of the network which includes resistors 36 and 37, a measuring slidewire resistor 38, and resistors 39 and 40. The loop of the circuit, which includes resistors 36 and 37, measuring slidewire 38, resistors 39 and 40, the battery 30, and adjustable resistor 32, is designed for flow of a current of magnitude which is large with respect to the maximum measurable current which will flow through cell 10 with the maximum voltage applied thereto. If it be assumed that there be a potential between the contact 17a and the point 35, current will flow, for example, by way of conductor 15, cell 10, conductor 16, manually operable switch 41, conductor 42, contact 43a, included portion of resistor 43, a resistor 44, contact 38a, and by way of the lower part of slidewire resistor 38 to the point 35.

By means of a suitable detector shown as including the amplifier 24 and the movable contact 45 of a vibrator operable alternately between the stationary contacts as by an operating coil 46 energized from an alternating current source of supply, the motor 25 is energized to adjust slidewire contact 38a in a direction and to an extent to bring to zero the input signal applied to amplifier 24. The vibrator-contact 45 applies an alternating current signal to the amplifier 24, the phase of which will depend upon the direction of unbalance of the voltages included in the input circuit thereof. When the voltage drop between contact 43a and contact 38a exceeds the voltage drop between contact 38a and point 35, the phase will be in one direction, and when the drop is greater between the contact 38a and the point 35 the phase will be reversed. Thus the phase of current in motor winding 25a will reverse with respect to the phase of current in winding 25b to reverse the torque of the motor 25. At balance, which is closely maintained by the operation of amplifier 24 and motor 25, the potential of the point 35, of course, is equal to the potential at contact 43a. Hence the voltage applied to the cell 10 between contact 17a and conductor 16 is the same as the potential existing between contact 17a and the point 35.

Inasmuch as the current flow from the battery 30 through the branch including resistors 36 and 37, slidewire 38, and resistors 39 and 40 is constant, the potential of the point 35 remains fixed with respect to conductors 26 and 27. The current flowing through the branch including the resistor 28, the slidewire 17, and the resistor 29 produces a potential drop between contact 17a and conductor 27 which is dependent on the amount of resistance between contact 17a and conductor 27 and which for the range of movement of the contact 17a with respect to resistor 17, applies to the cell 10 a voltage which varies over a range of two volts with respect to the potential at point 35. If knob 34 is operated simultaneously to increase resistor 28 while decreasing resistor 29, or vice versa, it will be observed that for any given position of contact 17a relative to resistor 17 the potential of contact 17a will vary with respect to point 35 because of the change of resistance introduced between contact 17a and conductor 27, though the resistance of the branch including resistor 29 remains the same. In this manner, by adjusting knob 34 with reference to an associated scale 34a, there may be selection of the initial and final values of the voltage applied to the cell 10, as for example, from zero to −2 volts, −1 to −3 volts, or from +1 to −1 volt.

The foregoing arrangement has been found particularly useful in conveniently selecting the initial and final values of the variation of voltage applied to the cell 10 without change of the range of the voltage variation, and in practice it will sometimes be desirable to provide switches in lieu of the continuously variable resistors 28 and 29 in which case, for each position of the switch, the initial and final voltage applied to the cell 10 by movement of contact 17a will be predetermined.

It will be recalled that for a plurality of materials in the container 13 there will appear on the chart a plurality of changes in current of the type indicated on the chart 19 of Fig. 1 between the reference characters 19a and 19c. Such changes have also been illustrated in Fig. 3 which may be taken as part of a typical record produced on the chart for a solution having several constituents therein. Besides the abrupt change of current indicated at the region 19d, there are two other regions, 19e and 19f, where the current rapidly changes with a small variation of applied voltage, each of the regions 19e and 19f being indicative of the presence of an additional constituent in the cell 10. For greater accuracy in identification of the mid-point 19b it is desirable to provide greater sensitivity of the system to produce substantially full-scale deflection of the instrument including the pen and index 21 for a current variation corresponding to the region between 19a and 19c. Similarly, for greater accuracy in identification of mid-points 19g and 19h it is desirable to provide adequate sensitivity for full-range deflection of the instrument for current variations corresponding with the region between 19c and 19k, and again for the region between 19k and 19i. In each case compensation is made for the effect of the current below each lower limit, i. e. 19c and 19k, respectively.

In accordance with the invention, the foregoing compensation is provided by means of a further branch of the network of Fig. 1 comprising a resistor 47 and a variable resistor 48, the contact 48a of which is connected through a resistor 49, a variable resistor 50 and by contact 50a thereof to the contact 43a of resistor 43.

Current flow through the constant resistance branch including resistors 47 and 48 develops a potential between the contact 48a and the conductor 51, the magnitude of which is determined by the position of contact 48a with respect to resistor 48. Accordingly, a current will flow through a path including resistor 49, the included parts of variable resistors 50 and 43, resistor 44, a part of slidewire 38, resistor 39 and conductor 51. The magnitude of the current flowing will, of course, depend upon the magnitude of the derived potential as between contact 48a and conductor 51. Its magnitude can be varied by adjusting the position of contact 50a with respect to resistor 50, the values of resistors 39, 44, and 49 and the position of contact 48a relative to resistor 48 remaining fixed.

The relative values of the resistors 39, 44, 49 and 50 are selected to provide the desired range of current with adjustment of contact 50a from one limit to the other.

Inasmuch as at balance the point 35 is at the same potential as the contacts 43a and 50a, the current flowing through the resistor 49 by reason of setting of contacts 48a and 50a will have a value determined by the potential difference between contact 48a and contact 50a, the resistance of resistor 49 and the included resistance of resistor 50. The current flowing through the resistor 49 also flows through the included part of resistor 43, resistor 44, and the lower part of the slidewire 38 and is effective to change the balance point of contact 38a with respect to slidewire 38. The degree of that change will depend upon the magnitude of the current through resistor 49 which may be readily adjusted over a fairly wide range by operation of a knob 52 to move contact 48a relative to resistor 48.

By thus predetermining the balance point of contact 38a with respect to slidewire resistor 38, the zero position of the pen-index 21 of the indicator-recorder 20 can be made to correspond with any predetermined value of current flowing through the cell 10. More particularly, each of the current values 19c and 19k may, for successive measurements, be brought to the same relative position on the chart as 19a appears in Fig. 3 and with the same current sensitivity of the system for each successive measurement. For successive examination of the current changes between 19a and 19c, 19c and 19k, and 19k and 19i, two adjustments are made for each zone; first, current sensitivity will be properly adjusted for the zone by a knob 53 which simultaneously moves contacts 43a and 50a relative to their resistors 43 and 50, and then contact 48a will be moved to a position to bring the recorder response for the lower current limits of each zone; that is, 19a, 19c and 19k to a position on the chart approximately corresponding with 19a.

The manner in which the system functions to achieve the foregoing desirable operation will be further explained in detail in connection with Fig. 2 which is the electrical equivalent of a part of the circuit thus far described, but with simplifying modifications thereof, the battery 30a providing a variable voltage source covering the range developed between contact 48a and point 35 of Fig. 1.

In Fig. 2 it will be observed the illustrated part of the measuring network comprises two branches, the one including a part of the variable resistor 50 and the source of potential which has been illustrated as a battery 30a with a tap 48a adjustable by the knob 52. The other branch includes a part of the resistor 43 and a part of the measuring slidewire 38 energized by way of variable resistor 32 by battery 30. The detector including the movable contact 45 of the vibrator is connected across said branches of the circuit by way of conductors 54 and 55. The current to be measured is introduced into the network by way of input terminals 56 and 57 which are connected across the network in parallel with the detector. By adjusting the knob 53 simultaneously to change the included resistance of resistors 43 and 50 the current flow through the lower part of slidewire 38 can be adjusted while maintaining the potential drop between conductor 59 and contact 38a and between conductor 59 and contact 48a the same as before the adjustment thereof. In this manner the current sensitivity of the system can be adjusted as desired without changing the balance point in the absence of current flow into the network by way of terminals 56 and 57. More particularly, current flowing from battery 30a by way of conductor 58 traverses a part of slidewire 38, leaving the same by way of contact 38a, passes through resistor 44, the included part of resistor 43 by way of conductor 59 through the included part of resistor 50 and by resistor 49 to battery 30a.

If the resultant current flow produces a voltage $E_4$ across the detector as between conductors 58 and 59, the motor 25 is energized to adjust the contact 38a in a direction and to an extent to reduce said voltage $E_4$ to zero. Inasmuch as the detector and amplifier 24 control the operation of motor 25 and contact 38a to maintain the voltage $E_4$ at zero value, it will be seen at once that the magnitude of the current from battery 30a will be determined solely by resistor 49 and the included part of resistor 50 and the magnitude of the voltage applied by source 30a. Thus, it will be seen that the included part of resistor 43, resistor 44, and the included part of slidewire 38 do not affect the magnitude of the current flowing from source 30a. This explains why with reference to Fig. 1 the statement was earlier made that the magnitude of the current flowing through resistor 49 is determined by its resistance, the included resistance of resistor 50, and the potential applied between the contacts 48a and 50a.

Continuing the discussion with reference to Fig. 2, the current sensitivity of the system, that is the response of the detector-amplifier 24 and of motor 25 to a given value of current flow, is determined by the resistor 44 and the included portion of resistor 43 in the detector mesh of the circuit for a constant applied voltage from battery 30 to slidewire 38. As the included part of resistor 43 is increased, the current sensitivity is increased. This will be readily appreciated since for a given change of current through an increased included portion of resistor 43 there will be a greater potential difference introduced into the detector circuit, thus requiring an increased movement of contact 38a to maintain zero potential between conductors 58 and 59.

It will now be assumed that the current sensitivity will be adjusted as may be desired by rotation of knob 53 to cover the range of current change from 19c to 19k of Fig. 3. There will be simultaneously moved the contacts 43a and 50a relative to resistors 43 and 50. The movement of contact 43a increases the included resistance of resistor 43 at the same time that the contact 50a increases the included resistance of resistor 50. Thus, while the increased included resistance of resistor 43 increases the current sensitivity of the system, it does not change in the system the effect of current from the source 30a inasmuch as that current is reduced by the increase of the included resistance of resistor 50 in the same ratio as the increase in the included resistance between conductor 59 and contact 38a. In other words, the current from source 30a is varied inversely as the resistance between conductor 59 and contact 38a.

The knob 52 will then be adjusted for flow of current through the included part of resistor 43 to establish a balance point at the low end of the scale 22 for measurement of the current change of a cell connected to terminals 56 and 57 as between the regions of 19c and 19k of Fig. 3. The adjustment will be such that for a current flow corresponding to the value of 19c the contact 38a will be positioned by motor 25 near the low end of slidewire 38 with positioning of index 21 at the low, or right-hand end of the scale 22 as viewed in Figs. 1 and 2. This adjustment corresponds with the adjustment of contact 48a of Fig. 1, as already described.

The setting by knob 52 of a desired balance point of contact 38a with respect to slidewire 38 may be with a part, or all, of the resistance of resistor 43 included in the circuit. When that included resistance is changed to vary the current sensitivity of the system, the balance point without change in the flow of current by way of terminals 56 and 57 will be changed due to the change in the included value of resistor 43. This will necessitate a further adjustment of knob 52 if an unchanged balance point is desired with changed current sensitivity in the presence of current flowing into the network by way of terminals 56 and 57. However, in the absence of current flowing into the network by way of the terminals 56 and 57, the knob 53 can adjust contacts 43a and 50a between one limiting position and the other without change in the balance point of contact 38a. This is a particularly desirable feature of the present invention.

It is emphasized that inasmuch as the voltage between conductors 58 and 59 is maintained at zero value, the resistance of the network as viewed from terminals 56 and 57 is zero. Accordingly, the current flowing through the cell connected to terminals 56 and 57 will change in value solely in accord with the change in characteristics of the material with respect to the applied voltage, and the change will not depend upon the resistance of the current-measuring circuit. Such a system is likewise of advantage in applications for the measurement of current from barrier-layer cells, and the like.

Again referring to Fig. 1, it will be seen that a scale 60 may be provided for the resistor 43 which may be calibrated in terms of current sensitivity. Similarly, a scale may be provided for the resistor 48 if desired, though one has not been illustrated in Fig. 1.

A further advantage of Fig. 1 resides in the fact that the measuring system as a whole can be supplied from the single source of supply 30. Standardization is readily provided by a standard cell 62, and galvanometer 63 may be utilized periodically to check the flow of current from battery 30 as by closure of standardizing switch 64 to complete the circuit through the standardizing resistor 31. If the potential drop across the resistor 31 is not equal and opposite to that of standard cell 62, resistor 32 is adjusted until galvanometer 63 reads zero. By including the standardizing resistor 31 in a voltage dividing branch of the nework including resistor 65, a normally available 6-volt storage battery may be utilized for the source 30 for development of exactly 6 volts between conductors 26 and 27, thus providing for a range of polarizing voltage from —3 volts to +3 volts between conductor 15 and point 35 or conductor 16.

There is also provided a convenient check of the proper functioning of the system for accurate measurement of current flow comprising a switch 41 which, when operated to connect a calibrated resistor 66 into the network in place of the cell 10, causes with a given setting of the contact 17a and contacts 28a and 29a flow of a known current which should then be properly indicated on the scale 22. If such known value of current is not indicated on the scale 22, the instrument will not be in calibration, and suitable adjustments can be made.

Mention has earlier been made of the fact that the current flowing in the outer loop of the measuring circuit including the slidewire 38 is large, for example of the order of 50 milliamperes, compared with the maximum measurable current which may flow through the cell 10, of the order of 150 microamperes.

In a particular embodiment of the invention, the following circuit parameters have been found suitable, though it is to be understood they are to be taken as suggestive and not as limitative on the scope of the invention: In the external circuit or in the outer loop there were provided a resistor 36 of the order of 50 ohms, a resistor 37 of 1.2 ohms the slidewire 38 of 0.8 ohm the resistor 39 of 1.2 ohms, resistor 40 of 50.69 ohms, and the resistor 32 of a maximum resistance of about 1000 ohms. The standardizing resistor 31 is 203.88 ohms, with resistor 65 having a value of 996.12 ohms. The resistors 28 and 29 have identical ranges of resistance variation, for example, 40 ohms, while the slidewire 17 has a resistance of 40 ohms. Resistor 47 has a resistance of 10 ohms, with the slidewire 48 of 10 ohms. The resistors 44 and 49 are equal in value, each being a 400-ohm resistor. Resistors 43 and 50 are likewise identical, each having a resistance value of 39,600 ohms.

It may be here explained that the resistors 49 and 50 need not be identical with resistors 44 and 43, though it is essential that resistors 49 and 50 have resistance values which bear the same ratio to each other as resistor 44 bears to resistor 43. It is necessary that the change in resistance of resistor 50 by adjustment of contact 50a with respect to the corresponding change in resistance of resistor 43 with respect to contact 43a be in the same ratio, i. e., the ratio $$\frac{R49}{R50} \text{ or } \frac{R44}{R43}$$

the two being equal.

While reference has been made to the detector-amplifier and motor for adjustment to maintain the system in balance, it is to be understood that any suitable type of detector may be utilized, such, for example, as one of the mechanical relay type as shown in Squibb Patent 1,935,732. For a more detailed explanation of a suitable electronic type, reference may be had to Williams Patents 2,113,164 and 2,367,746, the latter including a preferred null type of detector of the high input-impedance type.

For the sake of simplicity in presenting the present invention there have been omitted damping and filtering provisions associated with the detector-amplifier. Such arrangements have been disclosed in copending application Serial No. 716,973, filed December 18, 1946, by Albert J. Williams, Jr., now Patent No. 2,547,105, and a preferred type of such damping and filtering network is disclosed in concurrently filed application Serial No. 148,421, filed by co-inventor of the present case, Will McAdam.

While preferred modifications of the invention have been disclosed, it is to be understood further modifications may be made within the spirit and scope of the appended claims.

What is claimed is:

1. In a current-measuring system, the combination of a measuring network having two branches, a detector connected across said branches, each of said branches including a variable resistor and a variable source of potential, a current-carrying input circuit connected to said branches in parallel with said detector for flow of current to be measured, the potential difference across each resistor due to flow of current through the branch including that resistor being opposed by the source of potential in that branch, and means for simultaneously varying each of said resistors in the same direction in each said branch for varying the current flowing through both of them without changing the potential difference across either of them due solely to the current common to both of them.

2. A current-measuring system comprising a measuring slidewire and associated current supply, a resistor traversed by a current to be measured in circuit with a portion of said slidewire, a detector responsive to the difference in potentials across said portion of said measuring slidewire and said resistor for operating said slidewire to adjust the potential difference introduced by said slidewire into said circuit to a value equal and opposite to the potential difference across said resistor caused by current flowing therethrough, means for varying the resistance of said resistor to vary the current sensitivity of said system, means for introducing into said system a second current to establish a desired balance point in said system in the absence of said first-named current, and means for adjusting said second current inversely with change of resistance in said first-named resistor, thereby to retain the same balance point after the current sensitivity of the system is changed as before said change.

3. A measuring circuit comprising a high impedance detector including a current indicator, a measuring slidewire, a resistor in series with said detector and a portion of said slidewire, connections to said circuit for traverse of said resistor of an unknown current to be measured, a source of voltage for said slidewire of polarity for development of a potential drop across said portion of said slidewire equal and opposite to the potential drop across said resistor, means for producing flow of a second current of constant value through said resistor to establish a zero position of said indicator, and means for varying said resistor and simultaneously changing said constant current to a new value which does not change the potential drop due to flow of said constant current through said resistor but which variation of said resistor does change the potential drop across it due to flow therethrough of said unknown current.

4. A current-measuring system comprising a balanceable measuring network having two branches, a detector connected across said branches, one of said branches including a variable resistor and a measuring slidewire, the other of said branches including a variable resistor and a source of current, terminals connected across said branches of said network in parallel with said detector for applying thereto a current the magnitiude of which is to be measured, means for simultaneously varying said resistors for changing the current flow from said source through said slidewire while maintaining the potential drop due to the current flow from said source through each of said resistors the same as before adjustment thereof, and means including said detector for operating said slidewire to balance said network in measurement of said current.

5. A measuring system comprising a measuring network having two branches, a detector connected across said branches, one of said branches including a first variable resistor and a measuring slidewire, the other of said branches including a second variable resistor and a third variable resistor, a source of constant current common to said slidewire and said third resistor for producing potential differences across them, terminals connected across said branches of said network in parallel with said detector for applying thereto an unknown current, and means for simultaneously varying said first and said second resistors for changing the current flow from said third resistor through said slidewire while maintaining the potential drop due to said last-named current flow from said source through said first and said second resistors the same as before adjustment thereof.

6. A measuring system comprising a measuring network having two branches, a detector connected across said branches, each of said branches including a variable resistor and variable source of potential, a current-carrying input circuit connected to said branches in parallel with said detector for flow of current to be measured, the potential difference across each resistor due to flow of current through the branch including that resistor being opposed by the source of potential in that branch, means operable in response to a potential applied to said detector for adjusting one of said sources of potential difference to reduce substantially to zero the potential applied to said detector, and means for simultaneously varying each of said resistors in the same direction in each said branch for varying the current flowing through both of them without changing the potential difference across either of them due solely to the current common to both of them, the ratio of the resistance of each branch including said resistors remaining substantially constant upon said simultaneous adjustment of said resistors.

7. A current-measuring system comprising a resistor traversed by current to be measured, a measuring circuit including a slidewire and associated current supply in circuit with said resistor, a detector responsive to the difference between the potential differences introduced into said measuring circuit by said measuring slidewire and by said resistor for operating said slidewire to adjust the potential difference introduced by said slidewire into said circuit to a value equal and opposite to the potential difference introduced by said resistor due to current flowing therethrough, means for varying the magnitude of said resistor to vary the current sensitivity of said system, means for introducing into said system a second current to establish a desired balance point in the system in the absence of current to be measured comprising a branch of said network including a resistor providing a variable source of potential difference, and means for adjusting said second current in inverse ratio to change of resistance of said first-named resistor comprising a third resistor mechanically connected for adjustment with said first-named resistor and electrically connected in circuit with said variable source of potential difference, thereby to retain the same balance point after the current sensitivity of the system is changed as before said change.

8. A current-measuring system comprising a source of constant current, a current path of said system including a measuring slidewire for flow therethrough of current of large magnitudes as compared with the current to be measured, a measuring circuit for flow of current to be measured including a first variable resistor and an adjustable part of said slidewire, means including a detector responsive to the difference between the potential differences introduced into said measuring circuit by the included portion of said first variable resistor and said included part of said slidewire for adjusting the value of said included part of said slidewire to reduce to zero the difference between said potential differences, a branch of said system including a resistor for developing a potential difference by current flow, means including a second variable resistor connected to a selected part of said resistor for flow of current through said first variable resistor to introduce into said measuring circuit a potential difference to adjust the balancing position of said measuring slidewire, said first and second variable resistors being so constructed and arranged that both are simultaneously adjusted in the same ratio to change the included resistance in the measuring circuit with simultaneous inverse change of current flowing in series through said first and said second variable resistors, a third branch of said network including a third variable resistor connected respectively to opposite sides of said source of constant current through variable resistors for deriving a potential of predetermined magnitude and polarity with respect to a selected point of said measuring circuit and a cell having a current sensitivity variable in accordance with a condition under measurement subjected to said derived potential for producing in said network the current to be measured.

9. A current-measuring system for chemical analyses in which the current flowing through a solution in a cell with a changing voltage applied thereto varies in accord with characteristics of said solution, comprising a single source of current, a potentiometer included in a branch of said network for applying across said cell a potential difference, means for gradually changing said potential difference from one value to another, the current path of said cell including therein a resistor for developing in a measuring circuit a potential difference and a portion of a slidewire for developing in said measuring circuit an opposing potential difference, said slidewire as a whole being connected across said source of current, means including a detector responsive to the difference between said potential differences for adjusting said slidewire to reduce said difference to zero, said system having a branch thereof forming a variable source of potential, means for deriving a selected potential from said branch for flow of current through said resistor to change the balance point of said slidewire, and means for varying the current sensitivity of said measuring circuit without changing the balance point thereof in the absence of current to be measured comprising a resistor in series with said source of potential but not included in said measuring network for inversely varying the current from said source of potential with change of sensitivity of said measuring network.

10. A measuring system comprising a single source of current, said system, including a measuring network comprising three branches, a first branch forming a part of a measuring circuit including a slidewire resistor for developing in said measuring circuit a potential difference across a portion thereof, said second and third branches including resistors for developing potential differences in said branches, means including current paths from selected points of said second and said third branches for establishment of potentials of predetermined magnitude with respect to a selected point of said first branch, said measuring circuit including a resistor connected in series with said variable portion of said slidewire and in series with current flowing from said selected points of said second and third branches for producing a potential difference in said measuring circuit opposed by said portion of said slidewire, and means including a detector for adjusting the magnitude of said portion of said slidewire to reduce to zero the difference between the potential difference across said portion of said slidewire and that across said resistor.

11. The combination set forth in claim 10 in which there is included in series with at least one of said current paths a resistor for varying the flow of current in said measuring circuit, and means for simultaneously adjusting in the same direction the resistor included in said measuring circuit and the resistor included in at least one of said current paths inversely to change the current flowing in said path with change of said resistance in said measuring circuit.

12. A current-measuring system for chemical analyses in which the current flowing through a solution in a cell with a changing voltage applied thereto varies in accord with characteristics of said solution, comprising a single source of current, a potentiometer included in a branch of said network for applying across said cell a potential difference, means for gradually changing said potential difference from one value to another, the current path of said cell including therein a resistor for developing in a measuring circuit a potential difference and a portion of a slidewire for developing in said measuring circuit an opposing potential difference, said slidewire as a whole being connected across said source of current, and means including a detector responsive to the difference between said potential differences for adjusting said slidewire to reduce said difference to zero.

13. In a measuring system the combination of a source of supply, a network having first and second branches connected in series with said source, each of said branches including a variable resistor, said network having a third branch extending between and in adjustable circuit relation with said resistors in said first and second branches, said third branch including at least one variable resistor therein, detecting means, a circuit connecting said detecting means to said last-named variable resistor and to a point of said network for development in said detector circuit of a potential difference of magnitude varying with adjustment of one of said variable resistors, and condition-responsive means for applying in said detector circuit in opposition to said potential difference a second potential difference varying in magnitude with change in the magnitude of a condition.

14. In a measuring system the combination of a source of supply, a network having first and second branches connected in series with said source, each of said branches including a variable resistor, said network having a third branch the ends of which are connected in adjustable circuit relation with said resistors in said first and second branches, said third branch including at least a pair of variable resistors therein, detecting means, a circuit connecting said detecting means to said last-named variable resistor and to a point of said network for development in said detector circuit of a potential difference of magnitude varying with adjustment of one of said variable resistors, condition-responsive means for applying in said detector circuit in opposition to said potential difference a second potential difference varying in magnitude with change in the magnitude of a condition, means operable under the control of said detecting means for adjusting one of said first-named variable resistors to a balance point and means for simultaneously adjusting at least said pair of said variable resistors in directions for adjustment of a potential difference in a circuit common to both of them without changing the resistance of circuits connecting them to said source of supply for varying the measuring range without affecting said balance point in the absence of a potential difference produced by said condition-responsive means.

15. In a measuring system the combination of a source of supply, a network having first and second branches connected in series with said source, each of said branches including a variable resistor, said network having a third branch extending between said adjustable resistors in said first and second branches, said third branch including at least two variable resistors therein, detecting means, a circuit connecting said detecting means to one of said last-named variable resistors and to a point of said network for development in said detector circuit of a potential difference of magnitude varying with adjustment of one of said variable resistors, condition-responsive means for applying in said detector circuit in opposition to said potential difference a second potential difference varying in magnitude with change in the magnitude of a condition, means operable under the control of said detecting means for adjusting one of said first-named variable resistors to a balance point and means for simultaneously adjusting at least two of said variable resistors in said third branch for varying the current flow through both of said resistors in said third branch in inverse ratio to change of resistance with adjustment of one of said resistors in said circuit including said detecting means for carrying the measuring range without affecting said balance point in absence of a potential difference produced by said condition-responsive means.

16. In a measuring system the combination of a source of supply, a network having first and second branches connected in series with said source, each of said branches including a variable resistor, said network having a third branch extending between the resistors of said first and second branches and itself including resistors, at least two of them being variable and having resistance values providing a resistance for said third branch which is high compared with the resistances of said first and second branches of said network, detecting means, a circuit connecting said detecting means to one of said last-named variable resistors and to a point of said network for development in said detector circuit of a potential difference of magnitude varying with adjustment of one of said variable resistors, condition-responsive means for applying in said detector circuit in opposition to said potential difference a second potential difference varying in magnitude with change in the magnitude of a condition, means operable under the control of said detecting means for adjusting one of said first-named variable resistors to a balance point and means for simultaneously adjusting at least two of said variable resistors in said third branch for varying the current flow through both of said resistors in said third branch in inverse ratio to change of resistance with adjustment of one of said resistors in said circuit including said detecting means for varying the measuring range without affecting said balance point in absence of a potential difference produced by said condition-responsive means.

ROBERT H. CHERRY.
ALBERT J. WILLIAMS, Jr.
RAYMOND E. TARPLEY.
WILL McADAM.

References Cited in the file of this patent

UNITED STATES PATENTS

| Number | Name | Date |
| --- | --- | --- |
| 1,472,125 | Keeler | Oct. 30, 1923 |
| 2,099,349 | Rosebury | Nov. 16, 1937 |
| 2,267,551 | Cherry | Dec. 23, 1941 |
| 2,367,746 | Williams | Jan. 23, 1945 |
| 2,385,481 | Wills | Sept. 25, 1945 |
| 2,476,318 | Nelson | July 19, 1949 |
| 2,547,105 | Williams | Apr. 3, 1951 |
| 2,584,954 | Williams | Feb. 5, 1952 |